(12) United States Patent
Sanvido et al.

(10) Patent No.: US 7,886,115 B2
(45) Date of Patent: Feb. 8, 2011

(54) TECHNIQUES FOR IMPLEMENTING VIRTUAL STORAGE DEVICES

(75) Inventors: Marco Sanvido, Belmont, CA (US); Anand Krishnamurthi Kulkarni, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 591 days.

(21) Appl. No.: 11/777,850

(22) Filed: Jul. 13, 2007

(65) Prior Publication Data

US 2009/0019208 A1 Jan. 15, 2009

(51) Int. Cl.
*G06F 12/00* (2006.01)
(52) U.S. Cl. ........................................ 711/154
(58) Field of Classification Search ................ None
See application file for complete search history.

(56) References Cited

U.S. PATENT DOCUMENTS

| | | | | |
|---|---|---|---|---|
| 6,961,833 B2* | 11/2005 | Leung | | 711/163 |
| 7,451,249 B2* | 11/2008 | Cowan et al. | | 710/22 |
| 7,467,381 B2* | 12/2008 | Madukkarumukumana et al. | | 718/1 |
| 2003/0228728 A1* | 12/2003 | Yu et al. | | 438/201 |
| 2005/0021915 A1* | 1/2005 | Lowe et al. | | 711/154 |
| 2008/0072223 A1* | 3/2008 | Cowperthwaite et al. | | 718/1 |
| 2008/0114916 A1* | 5/2008 | Hummel et al. | | 710/266 |
| 2008/0126614 A1* | 5/2008 | Ooi et al. | | 710/38 |
| 2008/0189432 A1* | 8/2008 | Abali et al. | | 709/238 |

OTHER PUBLICATIONS

"FreeBSD GEOM Storage Virtualisation Layer ("gvirstor")," Feb. 3, 2007, http://wiki.freebsd.org/gvirstor, pp. 1-3.
"HP Integrity Virtual Machines Installation, Configuration, and Administration," Oct. 2005, edition 1, pp. 1-68.
"Virtual machine," Wikipedia, the free encyclopedia, Apr. 2, 2007, pp. 1-7.
M. Krause and R. Recio, "I/O Virtualisation and Sharing," PCI Express, 2006, pp. 1-56.

* cited by examiner

*Primary Examiner*—Hiep T Nguyen
(74) *Attorney, Agent, or Firm*—Steven J. Cahill

(57) ABSTRACT

Some embodiments include a storage device with a storage medium having a memory capacity. The storage device also includes virtual storage device firmware that is configured to directly respond to commands from a guest operating system in a virtual machine for accesses to a subset of the memory capacity of the storage medium when a virtual storage device is enabled.

18 Claims, 3 Drawing Sheets

TECHNIQUES FOR IMPLEMENTING VIRTUAL STORAGE DEVICES

BACKGROUND OF THE INVENTION

The present invention relates to storage devices, and more particularly to techniques for implementing virtual storage devices.

Virtualization is a technique that relates to the abstraction of one or more resources. A virtual machine is software that creates a virtualized environment between a computer platform and an operating system. One or more guest operating systems are part of the virtual machine. A virtual machine can, for example, be implemented by a software application that runs on a host operating system.

To implement a virtual machine, a virtual machine monitor (VMM) intercepts accesses to the storage device in the physical machine, and emulates the accesses. Whenever a guest operating system (OS) accesses the storage device via a read or write command, the VMM intercepts the access, and redirect the access to a host operating system (OS). At this point, the host OS accesses the storage device to read or write the required data. The data is usually stored in a file in the host OS file systems.

However, some problems arise when implementing a virtual machine. For example, each access to the storage device requires intervention by the host OS, which slows down the emulation. Also, the file emulating the storage device might be fragmented, which slows down even more guest OS sequential sector accesses, and makes the guest OS effort to keep files unfragmented useless.

Therefore, it would be desirable to provide techniques for virtualization that provide faster data accesses.

BRIEF SUMMARY OF THE INVENTION

Some embodiments of the present invention include a storage device with a storage medium having a memory capacity. The storage device also includes virtual storage device firmware that is configured to directly respond to commands from a guest operating system in a virtual machine for accesses to a subset of the memory capacity of the storage medium when a virtual storage device is enabled.

Various objects, features, and advantages of the present invention will become apparent upon consideration of the following detailed description and the accompanying drawings.

DETAILED DESCRIPTION OF THE INVENTION

According to some embodiments of the present invention, a guest operating system (OS) in a virtual machine has direct read and write access to a data storage device. The guest OS can perform direct accesses to the data storage device without monitoring or intervention by a virtual machine monitor (VMM). As a result, the speed of data accesses by the virtual machine increases.

The VMM can create a virtual storage device within a storage device. The guest OS performs direct data accesses to and from the virtual storage device without requiring intervention from the VMM. The virtual storage device can protect accesses to its stored data by ensuring that the guest OS only accesses data stored in the virtual storage device. When the virtual storage device receives a deactivation command, control of the storage device automatically returns to the VMM to prevent accesses by the guest OS to portions of the storage device that are unauthorized. After the virtual storage device has been deactivated, data in the virtual storage device becomes read-only. The VMM can remove the virtual storage device to make the memory capacity assigned to the virtual storage device readable and writable.

The virtual storage device can be, for example, a virtual hard disk drive (VHDD). The virtual hard disk drive corresponds to one or more portions of a hard disk drive that are dedicated for read and write accesses from a particular guest OS. A technique for implementing a virtual hard disk drive according to an embodiment of the present invention is illustrated in FIG. 1.

Figure 1:
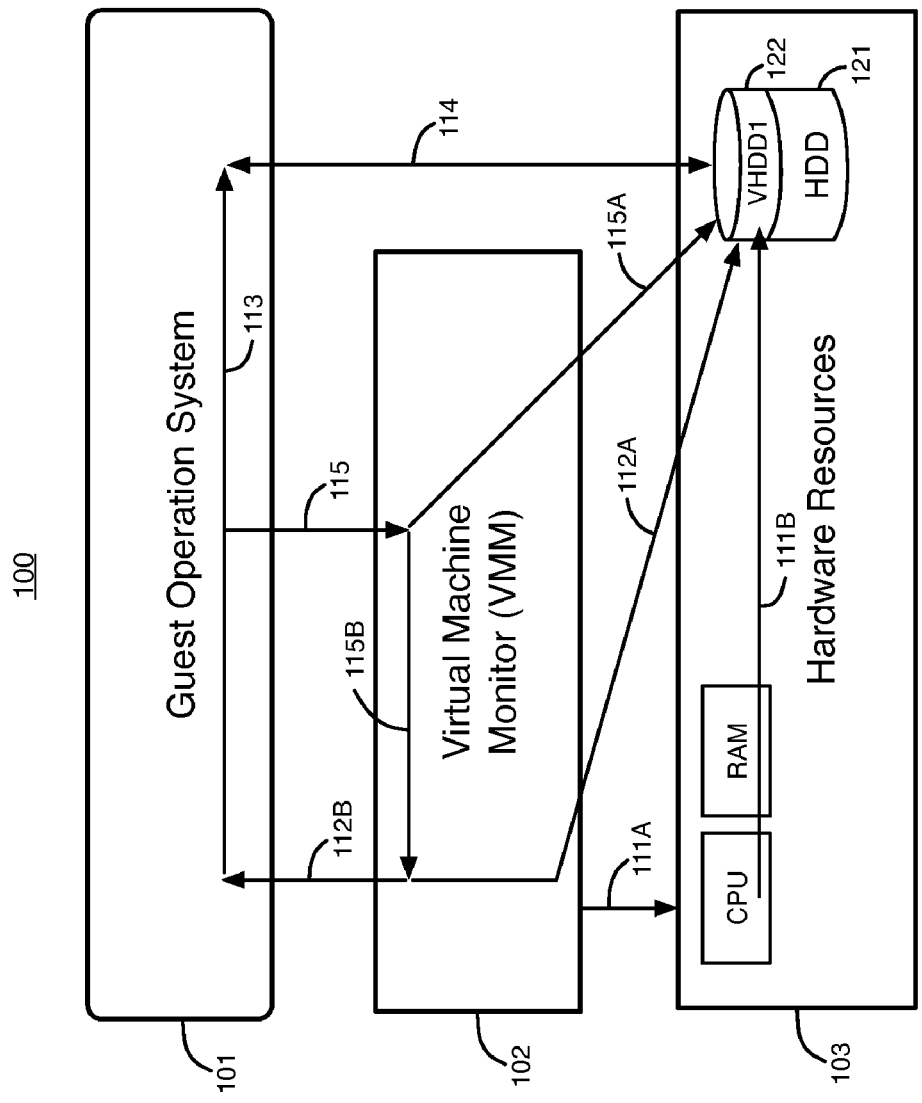
FIG. 1 illustrates a system and a technique for implementing a virtual hard disk drive, according to an embodiment of the present invention.

System 100 shown in FIG. 1 includes a guest operating system (OS) 101, a virtual machine monitor (VMM) 102, and hardware resources 103. VMM 102 is a device driver that runs on hardware resources 103. Guest OS 101 is part of a virtual machine that runs as a software application within a host operating system. The virtual machine can run one, two, three, or more guest operating systems. Only one guest OS is shown in FIG. 1 to simplify the drawing. Typically, guest OS 101, VMM 102, and hardware resources 103 are all part of a single computer machine.

VMM 102 can create a virtual storage device for guest OS 101. In the example of system 100, the virtual storage device is a virtual hard disk drive (VHDD1) 122 that is created within a hard disk drive 121. A process for implementing a virtual hard disk drive is now described in detail with respect to system 100.

The first steps 111A-111B involve creating a virtual hard disk drive in system 100 in response to a request from a virtual machine. In step 111A, virtual machine monitor (VMM) 102 initializes and allocates resources for guest operating system (OS) 101. The resources allocated to guest OS 101 can include, for example, memory resources, such as random access memory (RAM) space (e.g., in semiconductor memory), and input/output (IO) drivers and peripheral devices.

In particular, in step 111B, VMM 102 configures a first virtual hard disk drive (VHDD1) 122 within hard disk drive (HDD) 121. Initially, the virtual machine requests a particular amount of storage capacity for guest OS 101. In response to this request, VMM 102 assigns a range of hard disk sectors that have the requested storage capacity to VHDD1 122, at step 111B. Thus, the VHDD1 configuration corresponds to one or more sector ranges within HDD 121.

VMM 102 creates a virtual hard disk drive by assigning a set of sector-ranges in HDD 121 to the virtual hard disk drive. Once a set of sector-ranges are assigned to VHDD1 122, virtual hard disk drive firmware in HDD 121 can map read and write commands from guest OS 101 to the sectors that are assigned to VHDD1 122.

Figure 2:
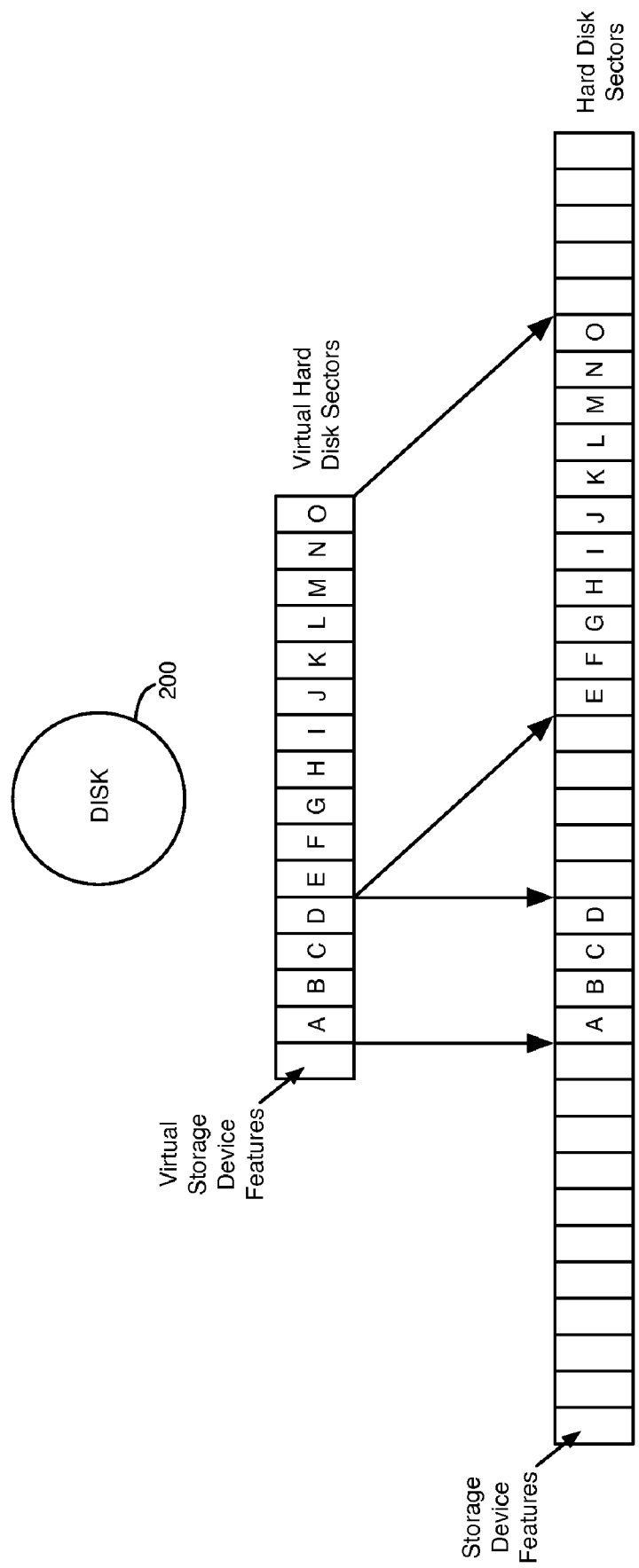
FIG. 2 illustrates an example of how a virtual machine monitor can assign a set of sector-ranges in a storage device to a virtual storage device, according to an embodiment of the present invention.

FIG. 2 illustrates an example of how VMM 102 can assign a set of sector-ranges in HDD 121 to VHDD1 122. In the example of FIG. 2, HDD 121 includes a magnetic hard disk 200. Hard disk 200 has a number of sectors, including sectors A-O. VMM 102 assigns sectors A-O in hard disk 200 to virtual hard disk drive 122. The sectors in the storage device that are assigned to the virtual storage device can be sequential or non-sequential. Sectors A-D and sectors E-O, for example, are non-sequential, as shown in FIG. 2.

VMM 102 can dynamically or statically create a virtual hard disk drive. For example, VMM 102 can create a virtual hard disk drive that has a fixed amount of storage space that does not change each time control returns to VMM 102.

According to one embodiment, the physical sectors allocated to the virtual hard disk drive (VHHD) are not defined at configuration time, but are assigned to the VHDD dynamically. The total VHDD storage capacity does not change. Instead, the effectively used HDD sectors can increase or decrease.

VMM 102 also selects a subset of the device features of HDD 121 that are available to virtual storage device VHDD1 122 as shown in FIG. 2. The device features can include, for example, the amount of storage space, a VHDD manufacturer, an interface type, security features, cache size, etc. In principle, all the features available in the HDD are remapped in the virtual hard disk drive.

VMM 102 can create multiple virtual hard disk drives (VHDD2, VHDD3, etc.) in HDD 121 that are accessible by multiple different guest operating systems in the virtual machine. Thus, HDD 121 is capable of embodying multiple virtual storage devices. Each virtual storage device is assigned to a subset of the sectors within HDD 121.

In step 112A, VMM 102 activates (i.e., enables) virtual hard disk drive VHDD1 122. Once VHDD1 122 has been activated, read and write accesses to HDD 121 are routed to the virtual hard disk drive firmware. The virtual hard disk drive firmware reads and writes data to and from to the sectors assigned to VHDD1 122 in response to incoming read and write commands from guest OS 101. Other sectors on HDD 121 that are not assigned to VHDD1 122 are not accessible and cannot be modified while VHDD1 122 is activated.

According to an alternative embodiment, multiple virtual hard disk drives within a single hard disk drive can be enabled at the same time and accessed by multiple guest operating systems. In this embodiment, a different interface (physical or logical) is assigned to each guest OS. For example, in SCSI (Small Computer System Interface), each guest OS can be assigned to a different logical unit number (LUN). As another example, in a multi port drive, e.g., a fibre channel (FC) drive, each of the ports can be assigned to a guest OS.

According to another embodiment, a host operating system (OS) can access portions of HDD 121 that are not assigned to VHDD1 122 while VHDD1 122 is enabled, if the host OS has a dedicated interface.

In step 112B, VMM 102 passes control of VHDD1 122 to guest OS 101. Once guest OS 101 has control of VHDD1 122, guest OS 101 executes within the virtual machine in step 113. Guest OS 101 can perform any operating system functions in step 113.

In step 114, guest OS 101 issues an access command to the hard disk drive. Because VHDD1 122 is active when guest OS 101 issues an access command, the access command is directly routed to VHDD1 122. In step 114, guest OS 101 can issue multiple read and write commands directly to VHDD1 122. The virtual hard disk drive firmware in HDD 121 remaps the read and write commands to sectors in HDD 121 that have been assigned to VHDD1 122.

Guest OS 101 can only read and write data to and from sectors in HDD 121 that have been assigned to VHDD1 122. In this way, VHHD1 122 controls access to the hard disk drive, without requiring assistance from VMM 102. VMM 102 does not need to monitor read and write commands from guest OS 101 to VHDD1 122 while VHDD1 122 is enabled. Guest OS 101 can perform read and write accesses of VHDD1 122 without intervention from VMM 102.

VHDD1 122 can respond to the read commands by reading data from sectors in HDD 121 that have been assigned to VHDD1 122 and sending the data directly back to guest OS 101. VHDD1 122 can respond to write commands by sending confirmation messages back to guest OS 101.

After a time interval or an interrupt, VMM 102 retakes control of HDD 121 in step 115. In step 115A, VMM 102 deactivates VHDD1 122. The time interval can be a fixed time interval or a variable time interval modified by VMM 102.

If guest OS 101 or VMM 102 attempts to deactivate VHDD1 122, VHDD1 122 automatically sends an interrupt to VMM 102. Upon receipt of an interrupt from VHDD1 122, VMM 102 immediately retakes control of HDD 121 and deactivates VHDD1 122. By sending an interrupt to VMM 102 upon receipt of a deactivation command, VHDD1 122 assures that guest OS 101 cannot gain access to data sectors of HDD 121 that are not assigned to VHDD1 122. After VHDD1 122 has been deactivated, VHDD1 122 still exists in HDD 121, but all the sectors assigned to VHDD1 122 in HDD 121 become read-only. Other sectors in HDD 121 can be fully accessible for reading and writing.

At step 115B, VMM 102 can return to step 112A to reactivate VHDD1 122 and step 112B to return control of VHDD1 122 to guest OS 101. After control of VHDD1 122 is returned to guest OS 101, guest OS 101 can repeat steps 113-114. At step 115, control of HDD 121 returns to VMM 102.

Alternatively, in step 115B, VMM 102 can return to initialization steps 111A-111B to dynamically change the amount of storage capacity assigned to VHDD1 122 within HDD 121. According to another alternative, VMM 102 can remove VHDD1 122 in step 115B. After removing VHDD1 122, VMM 102 can access the sectors assigned to VHDD1 122, and the sectors assigned to VHDD1 122 can be written over.

Some embodiments of the present invention can provide more aggressive server consolidation. Server applications (e.g., databases), if run as a guest OS, often need a dedicated storage device to achieve reasonable performances. On the other hand, a host operating system requires less storage hardware and consumes less power when implementing multiple virtual storage devices on a single storage device, as described above.

Figure 3:
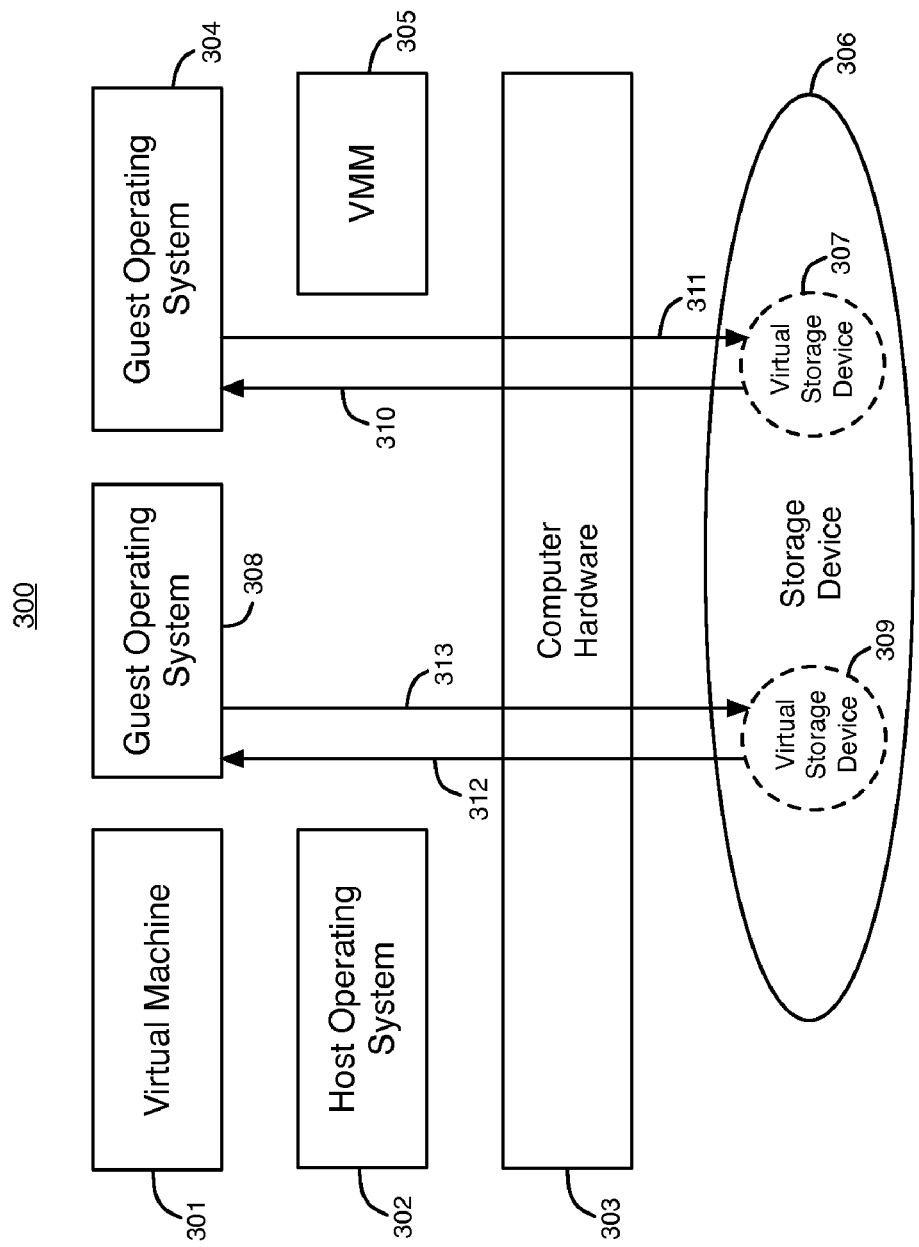
FIG. 3 illustrates a system for implementing virtual storage devices, according to an embodiment of the present invention.

FIG. 3 illustrates a system 300 that can implement virtual storage devices, according to an embodiment of the present invention. System 300 includes a virtual machine 301, a host operating system 302, computer hardware 303, guest operating system 304, virtual monitoring machine (VMM) 305, storage device 306, virtual storage device 307, guest operating system 308, and virtual storage device 309. Storage device 306 can be, for example, a magnetic hard disk drive, an optical disk drive, a magnetic tape drive, or other type of storage device. Storage device 306 includes a storage medium, such as a magnetic hard disk or an optical disk.

Host operating system (OS) 302 operates on computer hardware 303 (e.g., RAM, CPU, etc.). Computer hardware 303 is typically a single computer. Although, computer hardware 303 can represent multiple computers.

Virtual machine 301 can be, for example, software that runs as an application in host OS 302. Alternatively, a virtual machine can be software that replaces the host OS altogether and is merged with the virtual machine monitor. This alternative implementation of a virtual machine is typically referred to as a Hypervisor.

Guest operating system (OS) 304 and guest OS 308 are part of virtual machine 301. Virtual machine 301 can have two, three, four, or more guest operating systems. Virtual monitoring machine (VMM) 305 is a device driver on computer hardware 303.

Virtual storage device 307 is created by VMM 305 and dedicated to guest OS 304. Virtual storage device 307 contains a subset of the memory capacity of storage device 306. After VMM 305 enables virtual storage device 307, guest OS 304 can write data to virtual storage device 307 at step 311, and guest OS 304 can read data from virtual storage device 307 at step 310. Data accesses in steps 310 and 311 between guest OS 304 and virtual storage device 307 can be performed without requiring monitoring or intervention by VMM 305.

VMM 305 can create a second virtual storage device 309 on storage device 306. Virtual storage device 309 contains a subset of the memory capacity of storage device 306. Virtual storage device 309 is dedicated to second guest operating system (OS) 308. After VMM 305 disables virtual storage device 307 and enables virtual storage device 309, guest OS 308 can write data to virtual storage device 309 at step 313, and guest OS 308 can read data from virtual storage device 309 at step 312. Data accesses in steps 312 and 313 between guest OS 308 and virtual storage device 309 can be performed without requiring monitoring or intervention by VMM 305.

The foregoing description of the exemplary embodiments of the present invention has been presented for the purposes of illustration and description. It is not intended to be exhaustive or to limit the present invention to the examples disclosed herein. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is not intended that the scope of the present invention be limited with this detailed description.

The invention claimed is:

1. A storage device comprising:
   a storage medium having a memory capacity; and
   virtual storage device firmware configured to directly respond to commands from a first guest operating system in a virtual machine for accesses to a first subset of the memory capacity of the storage medium when a first virtual storage device is enabled, wherein the first virtual storage device comprises the first subset of the memory capacity of the storage medium, and wherein data stored in the first subset of the memory capacity of the storage medium is read-only when the first virtual storage device is disabled.

2. The storage device defined in claim 1 wherein the commands from the first guest operating system comprise commands to read data from the first subset of the memory capacity and commands to write data to the first subset of the memory capacity.

3. The storage device defined in claim 1 wherein the storage device is a hard disk drive and the first virtual storage device is a first virtual hard disk drive.

4. The storage device defined in claim 1 wherein the virtual storage device firmware is configured to directly respond to commands from the first guest operating system without intervention by a virtual machine monitor.

5. The storage device defined in claim 1 wherein control of the storage device returns to a virtual machine monitor when the first virtual storage device is disabled.

6. The storage device defined in claim 5 wherein the virtual machine monitor assigns the first virtual storage device more memory capacity in the storage device in response to a request from the virtual machine.

7. The storage device defined in claim 3 wherein the hard disk drive is configured to enable the first virtual hard disk drive and a second virtual hard disk drive concurrently, wherein the second virtual hard disk drive is assigned to a second guest operating system.

8. A storage device comprising:
   a storage medium having a memory capacity; and
   virtual storage device firmware configured to directly respond to commands from a first guest operating system in a virtual machine for accesses to a first subset of the memory capacity of the storage medium when a first virtual storage device is enabled, wherein the first virtual storage device comprises the first subset of the memory capacity of the storage medium, wherein the virtual storage device firmware is configured to directly respond to commands from a second guest operating system in the virtual machine for accesses to a second subset of the memory capacity of the storage medium when a second virtual storage device is enabled, wherein the second virtual storage device comprises the second subset of the memory capacity of the storage medium.

9. A computer system comprising:
   a storage device having memory capacity;
   code for assigning a first subset of the memory capacity of the storage device to a first virtual storage device; and
   code for responding to commands from a first guest operating system in a virtual machine for accesses to the first subset of the memory capacity of the storage device without intervention by a virtual machine monitor when the first virtual storage device is enabled, wherein the code for assigning and the code for responding are stored on a computer readable medium, and wherein data stored in the first subset of the memory capacity of the storage device is read-only when the first virtual storage device is disabled.

10. The computer system defined in claim 9 wherein the code for assigning a first subset of the memory capacity of the storage device to a first virtual storage device further comprises code for assigning a second subset of the memory capacity of the storage device to a second virtual storage device, and
   wherein the code for responding to commands from a first guest operating system in a virtual machine for accesses to the first subset of the memory capacity of the storage device without intervention by a virtual machine monitor when the first virtual storage device is enabled further comprises code for responding to commands from a second guest operating system in the virtual machine for accesses to the second subset of the memory capacity of the storage device without intervention by the virtual machine monitor when the second virtual storage device is enabled.

11. The computer system defined in claim 9 wherein the commands from the first guest operating system comprise commands to read data from the first subset of the memory capacity and commands to write data to the first subset of the memory capacity.

12. The computer system defined in claim 9 wherein the storage device is a hard disk drive and the first virtual storage device is a virtual hard disk drive.

13. The computer system defined in claim 12 further comprising:
   code for a host operating system to access the hard disk drive through a dedicated interface when the virtual hard disk drive is enabled, wherein the code for a host operating system to access the hard disk drive is stored on the computer readable medium.

14. The computer system defined in claim 9 further comprising:
code for returning control of the storage device to the virtual machine monitor when the first virtual storage device is disabled, wherein the code for returning control of the storage device to the virtual machine monitor is stored on the computer readable medium.

15. A method for providing a virtual storage device, the method comprising:
providing a storage device having a memory capacity;
assigning a first subset of the memory capacity of the storage device to a first virtual storage device; and
responding to commands from a first guest operating system in a virtual machine for accesses to the first subset of the memory capacity of the storage device without intervention by a virtual machine monitor when the first virtual storage device is enabled, and wherein data stored in the first subset of the memory capacity of the storage device is read-only when the first virtual storage device is disabled.

16. The method in claim 15 further comprising:
assigning a second subset of the memory capacity of the storage device to a second virtual storage device; and
responding to commands from a second guest operating system in the virtual machine for accesses to the second subset of the memory capacity of the storage device without intervention by the virtual machine monitor when the second virtual storage device is enabled.

17. The method defined in claim 15 wherein the storage device is a hard disk drive and the first virtual storage device is a virtual hard disk drive.

18. The method defined in claim 15 wherein the commands from the first guest operating system comprise commands to read data from the first subset of the memory capacity and commands to write data to the first subset of the memory capacity.

* * * * *